Feb. 26, 1963 R. W. BEALL, JR 3,078,883
ACID SOLUTION DISPENSER
Filed Oct. 23, 1961

INVENTOR.
RICHARD W. BEALL JR.
BY
ATTORNEY

United States Patent Office 3,078,883
Patented Feb. 26, 1963

3,078,883
ACID SOLUTION DISPENSER
Richard W. Beall, Jr., Hermosa Beach, Calif.
(500 Pointsetta Ave., Manhattan Beach, Calif.)
Filed Oct. 23, 1961, Ser. No. 146,940
12 Claims. (Cl. 141—198)

The present invention relates generally to the field of liquid dispensers, and more particularly to a dispenser for use in initially filling each cell of a storage battery with an acid solution to a desired height therein.

The present application is a continuation-in-part of my co-pending application Serial No. 35,556 filed June 13, 1960, entitled Combined Liquid Dispensing and Air Venting Apparatus, which issued as United States Letters Patent No. 3,005,475 on October 24, 1961.

A recent development in the merchandising of storage batteries is to ship them in a dry state to the retailer. The batteries are so maintained until actual sale thereof, at which time a sulphuric acid solution, which is supplied to the retailer in a collapsible bottle formed from a polymerized resin such as polyethylene or the like, is added to the battery whereby it is immediately activated by the acid solution.

Although the sale of batteries in the dry state has obvious advantages over previous methods of delivery to the merchandiser, a number of disadvantages are encountered as well, for the adding of the acid solution from the collapsible containers is not only an inconvenient, time-consuming operation, but to a degree, is dangerous as well. The sulphuric battery acid is extremely corrosive, and if not handled with the greatest of care can cause most painful burns.

Furthermore, the transfer of the acid solution from the collapsible container is, due to gravity, accompanied by gurgling and substantial lateral movement of the discharging stream of solution. Due to this somewhat unpredictable movement of the discharging liquid, it is most difficult to direct it into the cells of a storage battery through the relatively small inlet openings provided for this purpose without the use of a funnel. The use of a funnel is undesirable, for it is normally stored when not in use in such a location that dirt, dust, and other foreign material accumulates thereon and the next time the funnel is used in the filling of a storage battery, this foreign material will in all likelihood be carried into the cells along with the acid solution.

A further disadvantage in using a funnel to direct the flow of the acid solution into a storage battery cell is that the funnel obstructs the view of the interior of the cell whereby it is almost impossible to add the solution to the proper height therein. The initial filling of a battery with the acid solution is somewhat critical for it is usually the only acid that will be added to the battery during the life thereof. Thus, if too great a quantity of acid solution is initially added to the battery, it starts operating with an unduly high concentration of acid, which may ultimately lead to a shortened life for the battery. Also, other operational deficiencies may be encountered in the use of a storage battery having a too high concentration of acid. Although the water forming a part of the acid solution will be lost by evaporation and for other causes, this water may be easily replaced. The amount of distilled water which should be added to a storage battery cell during use of the battery is that necessary to raise the liquid level of the acid solution therein within a predetermined range relative to a target ring forming a part of the cell structure. This addition of distilled water to a storage battery cell or cells is not nearly as critical as the initial addition of the acid solution.

The primary purpose in devising the present invention is to overcome the inconvenience encountered in transferring an acid solution from a collapsible container or other receptacle in which it may be packaged to the cells of a storage battery, and with the assurance that only a sufficient quantity of the acid solution will be added to each cell to bring the liquid level therein to the proper height, which is normally just flush with the under surface of a ring-shaped target that is formed as an upper portion of the cell.

Another object of the invention is to supply a dispenser for an acid solution that may be removably placed in communication with a liquid holding collapsible container in a manner to permit a portion of the dispenser to be brought into pressure contact with the upper extremity of the inlet opening of each cell of a storage battery to discharge the acid solution into the cell and automatically terminate the discharge of the acid solution when the liquid level in the cell has risen to a desired elevation therein.

Yet another object of the invention is to furnish a dispenser that not only provides the advantages outlined above, but which dispenses the acid solution into the inlet of each storage battery cell without gurgling of the solution or lateral movement thereof to minimize spillage as well as the hazard of personal injury.

Still another object of the invention is to provide a dispenser for an acid solution that is particularly adapted for use in filling storage battery cells which is capable of filling the cells to a desired liquid level relative to the target ring therein, regardless of the vertical spacing of the target ring in respect to the upper extremity of the inlet opening formed as a part of each battery cell.

A still further object of the invention is to provide a dispenser for an acid solution that has an extremely simple mechanical structure which is ideally adapted to be injection molded from a polymerized resinous material, easy to assemble, and may be retained at a sufficiently low price as to encourage the widespread use thereof.

These and other objects and advantages of the invention will become apparent from the following description of a preferred form thereof, and from the accompanying drawing illustrating that form, in which.

Figure 5:
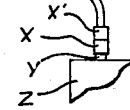
FIGURE 5 is a side elevational view of the dispenser shown being used to transfer an acid solution from an upper inverted container that can have the solution contained therein pressurized to a storage battery situated therebelow.

With reference to FIGURE 5 of the drawing for the general use and arrangement of the invention, it will be seen that a pressurized container U such as a plastic squeeze bottle, or the like, is provided which has a connector V removably engaging the neck (not shown) thereof, which connector in turn engages a flexible tube W. The lower end of tube W is connected to the liquid dispenser X of the present invention shown in detail in FIGURES 2 and 3 by a connector X'. The dispenser X which is normally closed, may be placed in the open position when disposed in pressure contact with the upper extremity of an upwardly extending boss Y on a cell Z of a storage battery, which boss defines a liquid inlet opening.

Figure 2:
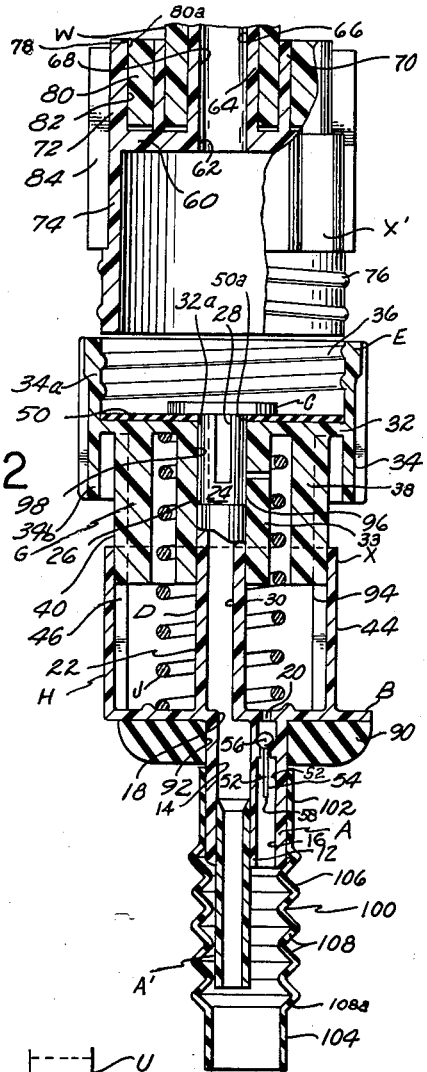
FIGURE 2 is a vertical cross-sectional view of the dispenser taken on line 2—2 of FIGURE 1, together with a connector to which it can be affixed.
Figure 4:
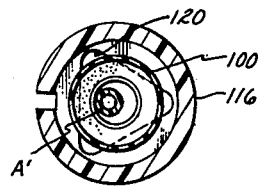
FIGURE 4 is a transverse cross-sectional view of the dispenser and a portion of the storage battery shown in FIGURE 3, taken on line 4—4 thereof.

The dispenser X (FIGURES 2 and 3) includes a vertically disposable, elongate, hollow, rigid member A that is defined by a cylindrical side wall 10 and an interior partition 12. The partition 12 extends downwardly in member A at least part of the length thereof, and is arcuate in transverse cross section, as shown in FIGURE 4. The partition 12 and side wall 10 cooperatively define a longitudinally extending liquid discharge passage 14, and an air vent or air discharge passage 16, which latter permits air to escape from the container Z during the time fluid is being discharged therein. Although a number of materials could be used, it has been found preferable to fabricate the member A from a polymerized resin that is injection molded to the desired shape. A transversely positioned plate B is rigidly affixed to the top of member A, and first and second openings 18 and 20 are formed in plate B that are in communication with the passages 14 and 16 respectively. The second opening 20, as shown in FIGURE 2, is much smaller in cross section than the first opening 18.

A rigid circular valve member C is transversely positioned and rigidly affixed to the upper end of a tubular support D. A lower portion 22 of support D is of larger transverse cross section than the upper portion 24 thereof on which the valve member C is mounted. A circumferentially extending body shoulder 26 is defined at the junction of the lower portion 22 and upper portion 24 of support D. The upper portion 24 has at least one elongate, longitudinally extending port 28 formed therein which communicates with a bore 30 that extends the length of support D.

The dispenser X also includes a valve body E which is defined by a circular plate 32 having a centrally disposed opening 32a formed therein through which the upper portion 24 of support D extends. A tubular sleeve 33 depends from plate 32 and is in communication with opening 32a. Sleeve 33 slidably and sealingly engages the lower portion 22 of tubular support D. The outer circumferential edge of plate 32 develops into a longitudinally extending cylindrical wall or shell 34, a portion 34a of which is situated above plate 32, with a portion 34b thereof being situated below the plate, as best seen in FIGURE 2. Threads 36 are formed on the interior surface of portion 34a, the purpose of which will be explained hereinafter.

A first guide G depends from plate 32 and slidably engages a second guide H that projects upwardly from plate B. Guide G includes a rigid cylindrical wall 38 which depends from the lower surface of plate 32, and two oppositely disposed, longitudinally extending ribs 40 are formed on wall 38. Guide H is defined by a second wall 44 which projects upwardly from plate B, as may best be seen in FIGURE 4, and the interior cross section of wall 44 is such as to snugly and slidably engage the exterior surface of first wall 38. Wall 44 is provided with two outwardly projecting, longitudinally extending groove-defining protuberances 46 that slidably engage the ribs 40. A compressed helical spring J is situated within the confines of guides G and H (FIGURE 2), with the lower end of the spring being in abutting contact with the upper surface of plate B and the upper end of the spring bearing against the lower surface of plate 32.

Overlying the plate 32 is a sheet 50 of resilient material such as rubber or the like, in which a centrally disposed opening 50a is formed which is of substantially the same transverse cross section as that of opening 32a and in vertical alignment therewith. A number of small circumferentially spaced projections 52 are formed on the inner surfaces of the partition 12 and side wall 10. Projections 52 are located a substantial distance below the lower surface of plate B.

A float 54, preferably fabricated from a polymerized resin that is buoyant in the lightest liquid that will be dispensed from container U, is disposed within the confines of the air vent passage 16. The float 54 comprises a ball 56 which in diameter is less than that of the interior transverse cross section of air vent 16, but greater than the diametrical spacing between the projections 52. The ball 56 has an elongate shank 58 depending therefrom that is slidably movable between projections 52. When liquid rises in the passage 16, the float 54 is raised due to the buoyancy thereof, with the ball 56 seating against the lower edge of the opening 20 and preventing air from passing upwardly through passage 16 and opening 20.

Connector X' comprises the upper portion of the dispenser X and is rigidly affixed to the lower end of the resilient tube or hose W. Connector X' is defined by a cylindrical plate 60 having a centrally disposed opening 62 formed therein. A tubular boss 64 projects upwardly from plate 60 and is in communication with opening 62. Boss 64 is of such transverse cross section as to be snugly and slidably insertable within a bore 66 formed in tube W. A longitudinally extending bore 68 is formed in boss 64 that is in longitudinal alignment with opening 62.

A number of circumferentially spaced, upwardly extending legs 70 are formed as an integral part of plate 60, and these legs are so radially spaced relative to boss 64 that the end portion of tube W is just slidably insertable therebetween. A first cylindrical shell 72 projects upwardly from the circumferential edge of plate 60, and a second cylindrical shell 74 depends downwardly therefrom. The lower exterior surface of shell 74 has threads 76 formed thereon that are adapted to engage the threads 36, and removably hold the dispenser X and connector X' together as an integral unit, as may best be seen in FIGURE 3.

An inwardly projecting, circumferentially extending lip 78 is formed on the inner edge surface of shell 72. A cylindrical locking member 80 is provided which is sufficiently thick that when inserted in an annulus-shaped opening 82 defined between shell 72 and legs 70, it forces the legs 70 into pressure contact with the exterior surface of the tubing W to grip an end portion of the tubing between the legs and the exterior surface of the boss 64. A circumferentially extending recess 80a is formed on the upper exterior surface of locking member 80, in which recess the lip 78 is permanently disposed when the locking member is fully positioned within the confines of the annulus-shaped opening 82. Once the locking member 80 is disposed within the confines of space 82 it cannot be removed. The end portion of tube W is pressure-gripped between the exterior surface of the boss 64 and legs 70, and is permanently affixed to connector X'. A number of longitudinally extending, circumferentially spaced ribs 84 are formed on the exterior surfaces of the upper shell 72 that may be threadedly engaged to hold the liquid dispenser X and connector X' together.

Figure 1:
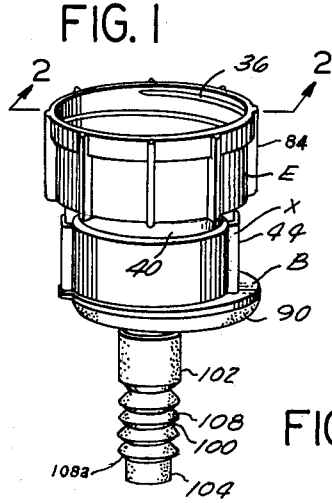
FIGURE 1 is a perspective view of the dispenser.

Air-tight pressure contact of the dispenser X with the upper extremity of the boss Y of cell Z is effected by a resilient ring-shaped pad 90 that abuts against the lower surface of plate B. The pad 90 has an opening 92 formed therein through which the rigid member A projects downwardly, as best seen in FIGURE 1. In transverse cross section, opening 92 is slightly smaller than the exterior transverse cross section of member A, and in consequence, the pad 90 is resiliently held in abutment with the plate B.

A tubular extension A' is provided that is affixed to the member A and projects below the lower edge thereof. Extension A' is in communication with the liquid discharge passage 14. A bellows 100 formed from a resilient material that is not adversely affected by a concentrated sulphuric acid solution is shown in FIGURE 2. Bellows 100 comprises an upper straight-walled cylindrical portion 104, a lower straight-walled cylindrical portion 102, an intermediate portion 106 that has a number of circumferentially extending, longitudinally spaced corrugations 108 formed therein.

The interior cross section of portion 102 is less than the exterior cross section of member A. Portion 102 frictionally grips the exterior surface of member A and supports the bellows 100 in a depending position therefrom. In FIGURE 2 it will be seen that a part of the intermediate portion 106 and all of the lower portion 104 extend below a lower edge 110 of extension A'.

In modern storage batteries, each cell Z thereof includes an upwardly extending boss Y that serves as a liquid inlet opening and a target ring 112 situated therebelow within the confines of the cell. The ring 112 is supported from the top 114 of the cell Z by a downwardly extending cylindrical side wall 116, or other supporting structure. Although this cell structure just described is common to substantially all modern storage batteries, it has been found that the distance between the upper surface 117 of the boss Y and the lower surface 118 of ring 112 may vary considerably between different brands of storage batteries. Also, it has been found that the opening 120 in the target ring 112 will vary both as to shape and transverse cross section. The ring 112 shown in FIGURE 4 as having a triangular opening.

Due to the variations in distance between the ring 112 and top 114 in different brands of storage batteries, the tubular extension A' is preferably sufficiently long as to project below the lower surface of the deepest of the rings 112 that will be encountered among the present-day batteries. The lower portion 108a of the central corrugated bellows portion 108 is of sufficiently great transverse cross section as to seat on that part of the ring 112 adjacent the opening 120. Also, the length of the lower straight-walled bellows portion 104 must be sufficient to permit the lower edge 104a thereof to be disposed at least flush with the thickest of the target rings 112 that will be encountered among the various brands of storage batteries.

Operation of the invention is extremely simple. The container U has an externally threaded neck (not shown) that may be threadedly engaged by the connector V. After threaded engagement of connector V and container U, the container may be inverted in the position shown in FIGURE 1. Liquid in container U will, of course, flow downwardly through the tube W and connector X' into the dispenser X. However, due to the action of compressed spring J, the plate 32 and resilient sheet 50 at all times tend to be moved upwardly away from the plate B, and the sheet 50 is forced into liquid-sealing contact with the under side of the valve member C. Thus the dispenser X is normally closed, and fluid cannot escape therefrom.

Figure 3:
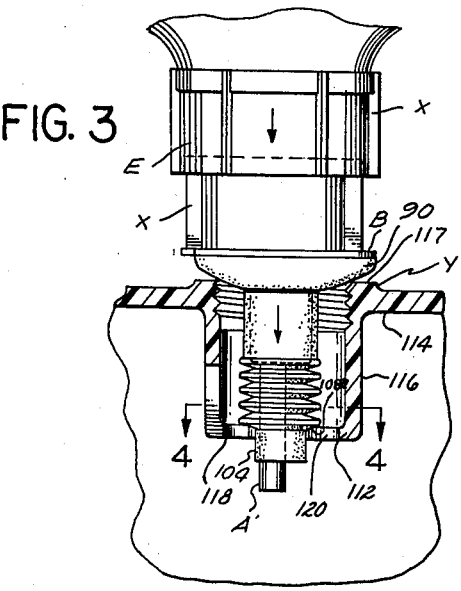
FIGURE 3 is a side elevational view of the dispenser showing the manner in which it is used in filling a storage battery cell with an acid solution to a desired height therein.

When it is desired to dispense liquid from the receptacle U into the container Z, the tubular member A, extension A', and bellows 100 are inserted within the confines of the boss Y as shown in FIGURE 3 whereby the resilient pad 90 is brought into pressure contact with the upper extremity of the boss when the shell 34 is manually moved downwardly relative to the plate B. This downward movement of shell 34, together with the connector X' removably attached thereto, can continue only until the lower edge of the first guide G comes into contact with the upper surface of plate B. The port 28 is then located above the sheet 50 whereby liquid in the valve body E can flow downwardly through the port 28 and bore 30 into the liquid passage 14 to discharge from extension A' into the confines of the cell Z. Concurrently with this fluid discharge into cell Z, the air in the cell is displaced upwardly through the bellows 100 and air vent passage 16 to flow around the ball 56 of float 54, and pass through the opening 20 into an enclosed space 94 which is defined by the upper surface of plate B, interior surfaces of guides G and H, lower surface of plate 32, and exterior surface of support portion 22. The ribs 40 fit sufficiently loosely in groove-defining protuberances 46 that space 94 is in communication with the ambient atmosphere. During this liquid discharge into the cell Z with concurrent upward flow of air through the vent passage 16, the float 54, due to gravity, is supported on the projections 52.

The upward flow of liquid into air vent passage 16, which occurs after sufficient liquid has been discharged into cell Z to raise the liquid level therein to contact edge 104a of bellows 100, causes the buoyant float 54 to rise from the projections 52 and the ball 56 to move into sealing contact with opening 20. Air cannot then escape from the cell Z and further discharge of liquid from container U into the cell is prevented as a result thereof. Thus, by means of the present invention any number of cells Z can be filled sequentially to desired liquid levels relative to the rings 112 therein.

It will be particularly noted that no liquid can enter the confined space 94, for the portion of the resilient sheet 50 surrounding the opening 32b is at all times in sliding liquid-sealing contact with the exterior surface of support portion 24. In the fabrication of the dispenser, it is desirable that the longitudinal distance between the lower edge of first guide G and the upper surface of plate B when the dispenser is in the closed position be as great as the length of port 28, so that the port is fully exposed to the liquid when the dispenser is in the open position shown in FIGURE 2.

As soon as the dispenser is not forcefully held in contact with the boss Y, the spring J expands and moves the dispenser from the open position (FIGURE 3) to the closed position shown in FIGURE 1. It should also be noted that while the connector X' is permanently affixed to the tube W, the connector X' actually forms a part of the dispenser when removably threaded thereto. Also, when the invention starts to be moved away from the boss Y, the liquid in air vent passage 16 is no longer under pressure and quickly drains into the cell Z. As the liquid drains from passage 16, the float 54 moves downwardly therewith until it rests on protruberances 52.

An air passage 96 extends transversely through sleeve 33, and is preferably of sufficiently small diameter as to have a high resistance to the flow of liquid therethrough. Passage 96 is so located in sleeve 33 as to effect communication between space 94 and the annulus-shaped space 98 between the external surface of the upper portion 24 of support D and the internal surface of sleeve 33 when the valve member C is in the closed position shown in FIGURE 2. As port 28 is in communication with annulus-shaped space 98 when the valve member C is in the closed position, the liquid passage 14 is vented to the atmosphere when the valve member is so disposed, and liquid as a result drains completely therefrom. This venting of passage 14 and bellows 100 completely eliminates the possibility that liquid will remain therein after the valve member C assumes a closed position to subsequently discharge or drip therefrom after the invention has been moved away from container Z.

It will be particularly noted (FIGURE 2) that due to the location of the air passage 96, no liquid ever tends to be forced therethrough into the space 94 where it could contact the spring J. When the valve member C is in the open position (FIGURE 3) the interiorly disposed end of passage 96 is sealed by the lower portion 22 of valve support D. When the valve member C is in the closed position (FIGURE 2) any liquid remaining in the liquid discharge passage will tend to flow downwardly therein, and in so doing create a negative air pressure thereabove which is relieved by inward flow of air from the ambient atmosphere through the passage 96. This feature is of the utmost importance where the liquid being dispensed is corrosive in nature and could attack the spring J, which is in most instances fabricated from a metal or alloy of metals. The air passage 96 is preferably located above the lower edge of port 28 when the valve member C is in the closed position shown in FIGURE 2. When air passage 96 is so disposed, all liquid that could drain therethrough to space 94 drains downwardly instead of through port 28 and support D to liquid passage 14.

Although the present invention is fully capable of achieving the objects and providing the advantages hereinbefore mentioned, it is to be understood that it is merely illustrative of the presently preferred embodiment thereof

I claim:

1. A dispenser for use in discharging liquid under pressure into a storage battery cell of a type that includes an upwardly extending boss on the upper portion of said cell and a target ring inside said cell until the liquid level in said cell has risen to a desired relationship with said ring whereupon further discharge of liquid from said dispenser ceases, said dispenser including:

(a) a valve body comprising a first plate having an opening formed therein, a cylindrical shell which at least extends upwardly from the periphery of said plate and is affixed thereto, and a tubular sleeve extending downwardly from said plate and communicating with said opening;

(b) a second plate having a liquid discharge opening and an air discharge opening formed therein;

(c) a valve member of greater cross-sectional area than that of said opening in said first plate;

(d) a tubular valve member support extending upwardly from said second plate and in communication with said liquid discharge opening, said support being slidably and sealingly disposed in said sleeve, which support has said valve member rigidly affixed to the upper end thereof, with at least one port formed in the upper portion thereof;

(e) first means which tend at all times to move said second plate away from said first plate for disposing said valve member in a liquid-sealing position relative to said first plate;

(f) an internally and longitudinally partitioned tubular member that defines a liquid discharge passage and an air discharge passage, which tubular member depends from said second plate, with said liquid and air passages being in communication with said liquid discharge and air discharge openings respectively;

(g) second means adjacent said second plate for effecting an air-tight seal with said discharge opening in said receptacle when brought into pressure contact with that portion of said receptacle surrounding said opening;

(h) third means in said air discharge passage that permit upward flow of air therethrough but seal said air discharge opening when liquid discharges upwardly in said air discharge passage;

(i) a resilient tube that extends downwardly from said partitioned tubular member, said resilient tube having at least one enlarged portion intermediate the lower end thereof and the lower end of said partitioned member, said enlarged portion being capable of removably engaging said target ring when that portion of said tube below said enlarged portion extends downwardly through said ring;

(j) and fourth means that removably engage said shell for discharging liquid under pressure therein when said partitioned member and said tube extend downwardly through said boss and said valve member has moved downwardly relative to said second plate to expose said port to said liquid, with said liquid continuing to discharge into said cell when said valve body is so disposed until the liquid level in said cell has risen to a desired relationship relative to said target ring which is determined by the position of the lower end of said resilient tube, and with said lower end when contacted by said liquid in said cell after it contacts said lower end of said tube then discharging upwardly into said air discharge passage to actuate said third means and cause flow from said liquid discharge passage and said tube to cease.

2. A dispenser as defined in claim 1 wherein said tube is formed with an upper tubular portion, a corrugated intermediate portion and a tubular lower portion, said enlarged portion being the lowermost part of said corrugated intermediate portion, and with said upper portion of said tube extending around at least a portion of said partitioned tubular member to engage the same and support said tube therefrom.

3. A dispenser as defined in claim 1 wherein said tube is formed with an upper tubular portion, a corrugated intermediate portion and a tubular lower portion, with said enlarged portion being the lowermost part of said corrugated intermediate portion, and with said upper portion of said tube extending around at least a portion of said partitioned tubular member to engage the same and support said tube therefrom;

(a) and in addition has a tubular extension depending therefrom that is disposed in said tube and is in liquid communication with said liquid discharge passage in said partitioned member.

4. A dispenser as defined in claim 3 in which the lower end of said extension is disposed above the lower end of said tube when said tube is not in engagement with said target ring, but with the lower end of said extension being below the lower end of said tube when said tube is in engagement with said target ring.

5. A dispenser as defined in claim 4 wherein fifth means are provided for venting said liquid discharge passage to the ambient atmosphere when said valve member is in a liquid-sealing position relative to said first plate.

6. A dispenser as defined in claim 4 wherein the upper portion of said valve member support in which said port is formed is of smaller transverse cross section than the interior cross section of said sleeve and cooperates to form an annulus-shaped space therewith, which sleeve has a transversely disposed air passage extending therethrough that is in communication with said annulus-shaped space when said valve member is in a liquid-sealing position relative to said first plate, with said air passage, annulus-shaped space, and port cooperatively serving to vent said liquid discharge passage to the ambient atmosphere when said valve member is in said liquid-sealing position.

7. A dispenser as defined in claim 4 wherein said second means is a resilient pad through which said partitioned member projects downwardly.

8. A dispenser as defined in claim 4 wherein said third means is a buoyant member of lesser transverse cross-section than that of the interior or said air discharge passage but of greater transverse cross section than that of said air discharge opening, and the configuration of said buoyant member is such as to seat in liquid-tight contact with the portion of said second plate surrounding said air discharge opening when raised upwardly in said air discharge passage by upward flow of liquid therein.

9. A dispenser as defined in claim 4 wherein said third means is a ball from which an elongate shank depends, said ball and shank being buoyant in the lightest liquid that will be used with said dispenser, with the diameter of said ball being less than that of said air discharge passage, and said ball sealing said second opening when seated against the portion of said second plate surrounding the same.

10. A dispenser as defined in claim 4 wherein a plurality of circumferentially spaced projections are provided on the interior surface of said elongate member that defines said air discharge passage, with said ball resting on said projections and said shank extending downwardly therebetween when said float means is in said first portion.

11. A dispenser as defined in claim 4 wherein said shell is provided with threads and said fourth means is a threaded connector that removably engages said threads and is connected to a source of liquid that can be placed under pressure.

12. A dispenser as defined in claim 11 wherein a flexible tube is provided, one end of which tube is connected to said source of liquid under pressure, with the other end of said tube being connected to said connector.

No references cited.